(12) United States Patent
Hiasa et al.

(10) Patent No.: US 9,338,336 B2
(45) Date of Patent: May 10, 2016

(54) IMAGE PICKUP APPARATUS

(71) Applicant: CANON KABUSHIKI KAISHA, Tokyo (JP)

(72) Inventors: Norihito Hiasa, Utsunomiya (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 13/898,553

(22) Filed: May 21, 2013

(65) Prior Publication Data

US 2013/0308035 A1    Nov. 21, 2013

(30) Foreign Application Priority Data

May 21, 2012  (JP) ................................. 2012-115521

(51) Int. Cl.
| | |
|---|---|
| *H04N 5/225* | (2006.01) |
| *H04N 5/232* | (2006.01) |
| *H04N 5/235* | (2006.01) |

(52) U.S. Cl.
CPC ................................... *H04N 5/2254* (2013.01)

(58) Field of Classification Search
CPC  H04N 5/23212; H04N 5/2254; H04N 5/2253
USPC ............. 348/349, 222.1, 335, 340, 345, 357; 359/626; 250/226
See application file for complete search history.

(56) References Cited

U.S. PATENT DOCUMENTS

| | | | | |
|---|---|---|---|---|
| 8,724,014 | B2 * | 5/2014 | Ng et al. ....................... | 348/349 |
| 8,811,769 | B1 * | 8/2014 | Pitts et al. ..................... | 382/275 |
| 2004/0105020 | A1 * | 6/2004 | Iwasawa ....................... | 348/240.3 |
| 2007/0070236 | A1 * | 3/2007 | Sano ..................... G02B 5/3083 | 348/335 |
| 2008/0309813 | A1 | 12/2008 | Watanabe | |
| 2009/0140131 | A1 * | 6/2009 | Utagawa ....................... | 250/226 |
| 2010/0265385 | A1 * | 10/2010 | Knight et al. ................. | 348/340 |
| 2012/0176506 | A1 * | 7/2012 | Tajiri ................... H04N 5/2254 | 348/222.1 |

(Continued)

FOREIGN PATENT DOCUMENTS

| | | |
|---|---|---|
| JP | 2007-004471 A | 1/2007 |
| JP | 2008-312080 A | 12/2008 |

OTHER PUBLICATIONS

Ren NG, "Fourier Slice Photography" 2005 ACM Trans. Graph. 24,735-744.
Todor Georgiev, et al., "Full Resolution Lightfield Rendering", Adobe Technical Report Jan. 2008.

(Continued)

*Primary Examiner* — Jason Flohre
*Assistant Examiner* — Xi Wang
(74) *Attorney, Agent, or Firm* — Rossi, Kimms & McDowell LLP

(57) ABSTRACT

The image pickup apparatus includes an imaging optical system to cause light rays from an object plane to image on an image side conjugate plane with respect to the object plane, an image sensor including pixels and to photoelectrically convert the optical image, and an optical element array including optical element cells each of which conjugates the image side conjugate plane with the image sensor and which are arranged so as to cause light rays from a same point on the object plane to enter mutually different pixels depending on positions on a pupil plane of the imaging optical system through which the light rays pass. An arrangement pitch of the optical element cells in the optical element array is 25 times or less of an arrangement pitch of the pixels in the image sensor.

6 Claims, 11 Drawing Sheets

(56) References Cited

U.S. PATENT DOCUMENTS

2012/0229683 A1* 9/2012 Kobayashi et al. ........... 348/246
2012/0314947 A1* 12/2012 Komatsu ................. G06T 5/001
                                                                                          382/167

OTHER PUBLICATIONS

Todor Georgiev, et al., "Superresolution with Plenoptic 2.0 Camera", 2009 Optical Society of America.
Japanese Office Action for corresponding JP 2012-115521, mail date Jun. 24, 2014.

\* cited by examiner

IMAGE PICKUP APPARATUS

BACKGROUND OF THE INVENTION

1. Field of the Invention

The present invention relates to an image pickup apparatus that introduces light from an imaging optical system to an image sensor through an optical element array to perform image capturing.

2. Description of the Related Art

Image pickup apparatuses performing various operations on data acquired by using an image sensor to produce and output digital images have been proposed. For example, Todor Georgiev, et al., "Full Resolution Light Field Rendering", Adobe Technical Report January 2008 and Todor Georgiev, et al., "Superresolution with Plenoptic 2.0 Camera", 2009 Optical Society of America disclose image pickup apparatuses each capable of simultaneously acquiring two-dimensional light intensity distribution on an object plane and parallax information (hereinafter collectively referred to as "light field") by using a technique called "Light Field Photography". Such image pickup apparatuses enable, by performing image processing using the acquired light field, a post-image capturing process such as changing of a focusing position of a captured image (that is, refocusing) and adjustment of a depth of field.

However, in such image pickup apparatuses, it is necessary allocate pixels of the image sensor not only to storing of the two-dimensional light intensity distribution, but also to storing of the parallax information. Therefore, these image pickup apparatuses have a lower spatial resolution than image pickup apparatuses storing only the two-dimensional light intensity distribution.

On the other hand, Todor Georgiev et al., "Superresolution with Plenoptic 2.0 Camera", 2009 Optical Society of America discloses a configuration in which each of lens cells of a lens array forms optical images of one certain point on an image plane formed by an imaging optical system on multiple pixels and at mutually different positions of the pixels. The camera synthesizes two or more small images thus acquired to produce a high resolution reconstructed image. Such a method achieving high resolution is called "pixel-shifting super-resolution".

However, Todor Georgiev et al., "Superresolution with Plenoptic 2.0 Camera", 2009 Optical Society of America describes a method of acquiring an effect of the pixel-shifting super-resolution only on a specific focusing position. Therefore, when producing an image (refocused image) whose focusing position is changed, change of the effect of the pixel-shifting super-resolution depending on the focusing position may decrease the spatial resolution.

BRIEF SUMMARY OF THE INVENTION

The present invention provides an image pickup apparatus capable of providing high resolution refocused images focused on a lot of focusing positions while having a simple configuration.

The present invention provides as an aspect thereof an image pickup apparatus including an imaging optical system to cause light rays from an object plane to image on an image side conjugate plane with respect to the object plane, an image sensor including a plurality of pixels and to photoelectrically convert the optical image, and an optical element array including a plurality of optical element cells each of which conjugates the image side conjugate plane with the image sensor and which are arranged so as to cause light rays from a same point on the object plane to enter mutually different pixels depending on positions on a pupil plane of the imaging optical system through which the light rays pass. An arrangement pitch of the optical element cells in the optical element array is 25 times or less of an arrangement pitch of the pixels in the image sensor.

Other aspects of the present invention will become apparent from the following description and the attached drawings.

DETAILED DESCRIPTION OF THE PREFERRED EMBODIMENTS

Exemplary embodiments of the present invention will hereinafter be described with reference to the accompanying drawings.

In the following description, two types of image pickup apparatuses whose configurations of image pickup optical systems are mutually different will be described as Embodiments 1 and 2.

Image pickup apparatuses that are first and second embodiments (Embodiments 1 and 2) are provided with a lens array as an optical element array disposed between an imaging optical system and an image sensor in order to acquire light field including two-dimensional light intensity distribution on an object plane and parallax information. Moreover, the image pickup apparatuses of Embodiments 1 and 2 are capable of refocusing, that is, changing a focusing position of a captured image after image capturing to a lot of new focusing positions to provide high resolution refocused images. In order thereto, in the image pickup apparatuses of Embodiments 1 and 2, an arrangement pitch of lens cells constituting the lens array is set to 25 times or less of an arrangement pitch of pixels of the image sensor.

In Embodiments 1 and 2, description will be made of image pickup optical systems using the lens array. The lens array may be constituted by various lens cells such as solid lens cells, liquid lens cells and liquid crystal lens cells. In addition, in place of the lens array, an optical element array may be used which is constituted by various optical element cells two-dimensionally arranged such as diffractive optical elements.

Figure 1:
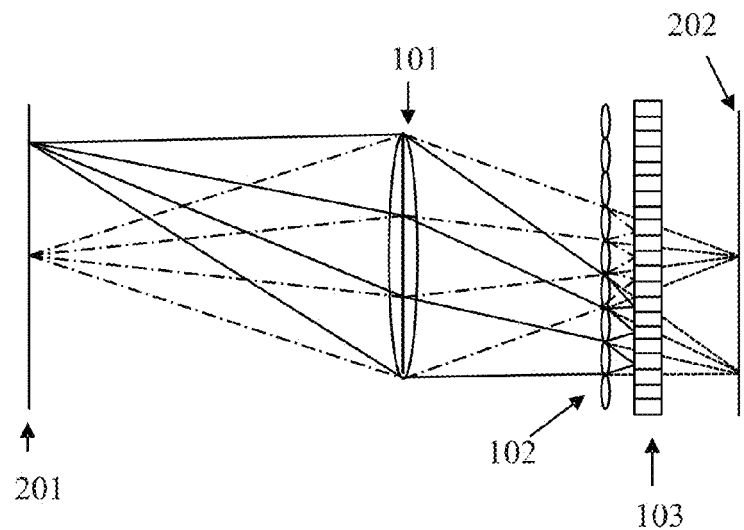
FIG. 1 shows a configuration of an image pickup optical system used for an image pickup apparatus that is Embodiment 1 of the present invention.
Figure 2:
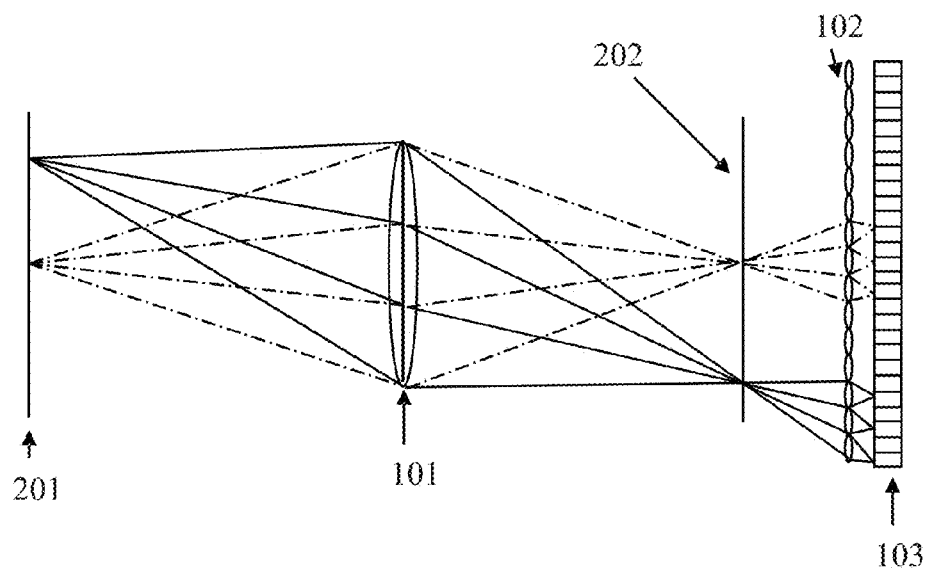
FIG. 2 shows a configuration of an image pickup optical system used for an image pickup apparatus that is Embodiment 2 of the present invention.

FIG. 1 shows a configuration of the image pickup optical system used in the image pickup apparatus of Embodiment 1. Numerical examples 1 to 3 as specific examples of the image pickup optical system in Embodiment 1 will be described later. FIG. 2 shows a configuration of the image pickup optical system used in the image pickup apparatus of Embodiment 2. Numerical example 4 as a specific example of the image pickup optical system in Embodiment 2 will be described later.

In FIGS. 1 and 2, each of the image pickup optical systems includes, in order from an object plane (201) side, an imaging optical system 101, a lens array 102 and an image sensor 103.

The imaging optical system 101 includes an aperture stop (not shown) and causes light rays from an object plane 201 to image on an image side conjugate plane 202 having a conjugate relation with the object plane 201; the conjugate relation is provided by the imaging optical system 101. The image sensor 103 includes a plurality of pixels and receives the light rays from the imaging optical system 101 to photoelectrically convert them.

The lens array 102 is constituted by a plurality of lens cells each conjugating the image side conjugate plane 202 with (a light-receiving surface of) the image sensor 103. The lens cells are arranged so as to cause light rays from a same point on the object plane 201 to enter different pixels of the image sensor 103 depending on positions on a pupil plane of the imaging optical system 101 through which the respective light rays pass.

In the image pickup optical system shown in FIG. 1, the lens array 102 is disposed on a further front side (that is, disposed closer to the object plane 201) than the image side conjugate plane 202 together with the image sensor 103. The light rays from the imaging optical system 101 are imaged on the image sensor 103 through the lens array 102. On the other hand, in the image pickup optical system shown in FIG. 2, the lens array 102 is disposed on a further rear side than (that is, disposed on an opposite side to the object plane 201 with respect to) the image side conjugate plane 202 together with the image sensor 103. The light rays imaged by the imaging optical system 101 are reimaged on the image sensor 103 by the lens array 102.

The two image pickup optical systems shown in FIGS. 1 and 2 are different in configuration, but same in function that the lens array 102 (lens cells) observes the object plane 201 for the imaging optical system 101 as an object and forms optical images thereof on the image sensor 103. Moreover, each of the two image pickup optical systems causes light rays, depending on positions and angles of the light rays on the object plane 201, to enter mutually different pixels of the image sensor 103, which enables acquisition of an image in which a plurality of small images whose image capturing view points and image capturing areas are mutually different are two-dimensionally arranged.

Figure 3:
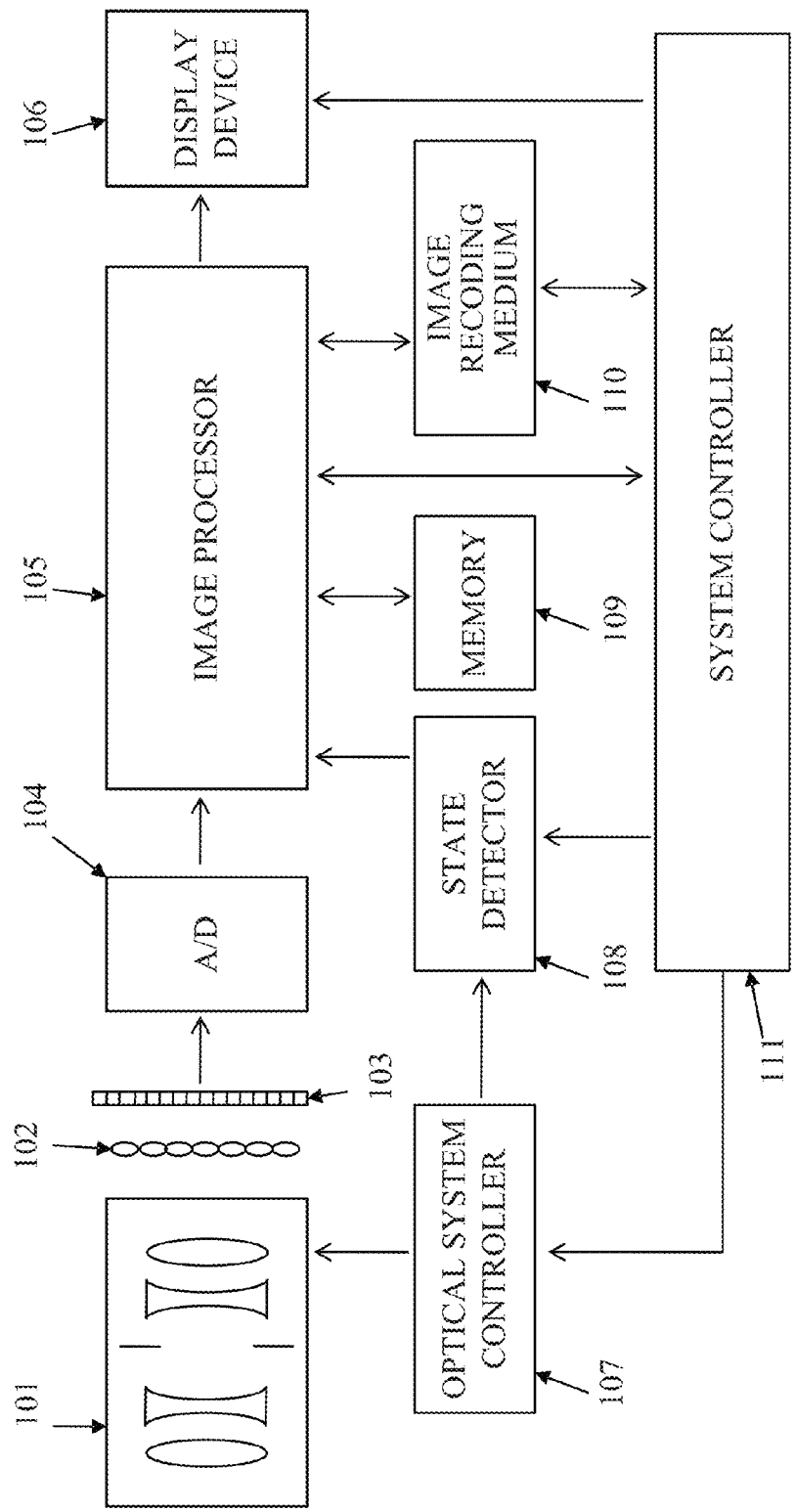
FIG. 3 is a block diagram showing a configuration of the image pickup apparatus of each embodiment.

FIG. 3 shows a configuration of the image pickup apparatus of Embodiments 1 and 2. The image sensor 103 is a two-dimensional photoelectric conversion element such as a CCD sensor or a CMOS sensor. The image sensor 103 outputs an electrical signal (analog signal) having a value corresponding to intensity of a light ray entering the pixel through the imaging optical system 101 and the lens array 102.

The electrical signal output from the image sensor 103 is converted into a digital signal by an A/D converter 104. An image processor 105 performs predetermined processes on the digital signal to produce digital image data. The image data is stored, together with image capturing condition information obtained from a state detector 108 and correlated with the image data, in an image recording medium 110 such as a semiconductor memory or an optical disk. The image capturing condition information includes an image capturing distance (object distance), an aperture value, a zoom value (focal length) and the like. The state detector 108 may obtain the image pickup condition information directly from a system controller 111, and may obtain information on the image pickup optical system, which is part of the image pickup condition information, from an optical system controller 107.

When displaying the image data stored in the image recording medium 110 on a display device 106 constituted by an LCD or the like, the image processor 105 performs a reconstruction process on a basis of the image pickup condition information. The reconstruction process reconstructs an image (hereinafter referred to as "a reconstructed image") according to image settings (view point, focusing position and depth of field) selected arbitrarily by a user, and the reconstructed image is displayed in the display device 106. Of the reconstructed images, one reconstructed on the basis of the focusing position selected (changed) by the user is hereinafter referred to as "a refocused image". Instead, in order to increase processing speed, a configuration may be employed which beforehand stores the arbitral image settings in a memory 109 and produces the reconstructed image without using the image recording medium 110 to display it on the display device 106. Moreover, the reconstructed image may be stored in the image recoding medium 110.

The above-described sequence of operations is controlled by the system controller 111. Drive of mechanisms for zoom, focus and aperture stop operations is controlled by the optical system controller 107 receiving instructions from the system controller 111.

Next, description will be made of conditions required for providing high resolution refocused images focused on a lot of focusing positions.

First, description will be made of decrease in spatial resolution with acquisition of the light field, and then, description will be made of a range in which refocusing is allowed (hereinafter referred to as "a refocusing range") and a method of producing the refocused image. Furthermore, description will be made of conditions of the lens array 102 (lens cell) required for acquiring high resolution refocused images focused on a lot of focusing positions. In the following description, the term "lens array 102" is used to also mean each of the lens cells constituting the lens array 102. Moreover, for simplification of description, calculation is performed in a one-dimensional system. However, similar calculation can be performed in a two-dimensional system.

Figure 4:
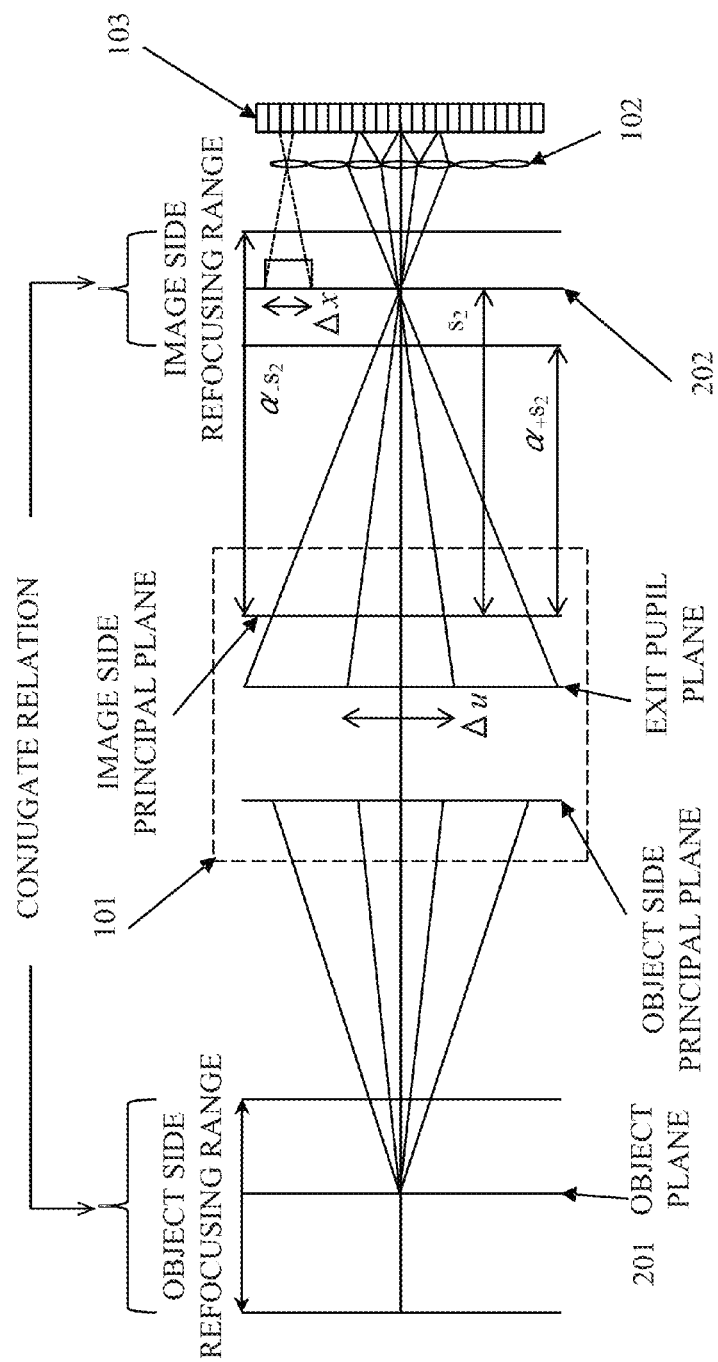
FIG. 4 shows a refocusing range in each embodiment.

With reference to FIG. 4, description of the decrease in spatial resolution in an image pickup system with acquisition of the light field will be made. FIG. 4 shows a more detailed configuration of the image pickup optical system of Embodiment 2 shown in FIG. 2. Light rays from the object plane 201 are imaged on the image side conjugate plane 202 through the imaging optical system 101.

In general image pickup optical systems to acquire only two-dimensional light intensity distribution, an image sensor is disposed on the image side conjugate plane 202 to sample an object image. A sampling pitch of the object image corresponds to an arrangement pitch of pixels (hereinafter referred to as "a pixel pitch") of the image sensor.

On the other hand, in the configuration of Embodiment 2 shown in FIG. 4, the lens array 102 disposed on the further rear side than the image side conjugate plane 202 reimages the light rays once imaged by the imaging optical system 101 on the image sensor 103. The sampling pitch on the image side conjugate plane 202 in this configuration corresponds to a size Δx of one pixel of the image sensor 103 projected onto the image side conjugate plane 202 through the lens array 102.

The sampling pitch Δx of a spatial component is obtained by multiplying the pixel pitch of the image sensor 103 by a magnification of the lens array 102 of $|\sigma_1/\sigma_2|$ where $\sigma_1$ represents a distance from an object side principal plane of the lens array 102 to the image side conjugate plane 202 of the imaging optical system 101 with respect to the object plane 201 and $\sigma_2$ represents a distance from an image side principal plane of the lens array 102 to the image sensor 103. Therefore, the image pickup system shown in FIG. 4, which acquires the light field, provides a spatial resolution obtained by multiplying that of the image pickup system acquiring only the two-dimensional light intensity distribution by $|\sigma_2/\sigma_1|$ ($|\sigma_2/\sigma_1|^2$ in the two-dimensional system). This description also applies to the image pickup optical system shown in FIG. 1.

On the other hand, the refocusing range is decided, as described in Ren Ng, "Fourier Slice Photography" 2005 ACM Trans. Graph. 24, 735-744, by Δu shown in FIG. 4 and ε; Δu represents a sampling pitch on the pupil plane (exit pupil) of the imaging optical system 101, which corresponds to angle information of the light rays, and ε represents a diameter of a permissible circle of confusion corresponding to the spatial resolution of the refocused image. A coefficient $\alpha_\pm$ is calculated by the following expression (1):

$$\alpha_\pm = \frac{1}{1 \pm \varepsilon/\Delta u} \quad (1)$$

A range conjugate with an image side refocusing range from $\alpha_+ s_2$ to $\alpha_- s_2$ shown by using the expression (1) with respect to the imaging optical system 101 is an object side refocusing range; $s_2$ represents a distance from the image side principal plane of the imaging optical system 101 to the image side conjugate plane 202 with respect to the object plane 201.

Next, description of the method for producing the refocused image will be made with reference to FIG. 5. In the following description, an image side conjugate plane of the imaging optical system 101 with respect to an object side plane on which the refocused image is to be focused is considered, and the image side conjugate plane is referred to as "a focusing plane of the refocused image".

Figure 5A:
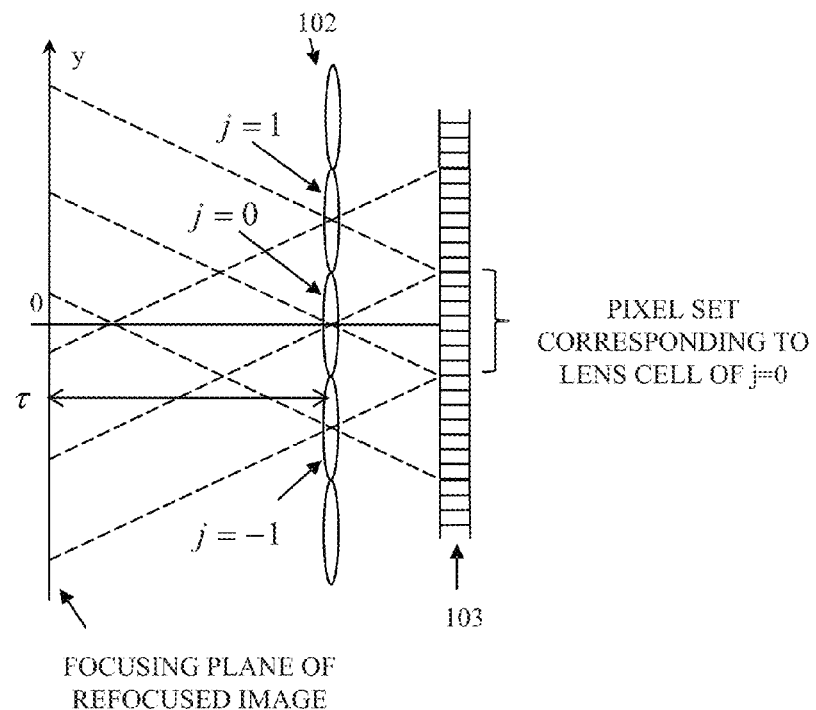
FIGS. 5A to 5C show pixel-shifting super-resolution in each embodiment.
Figure 5B:
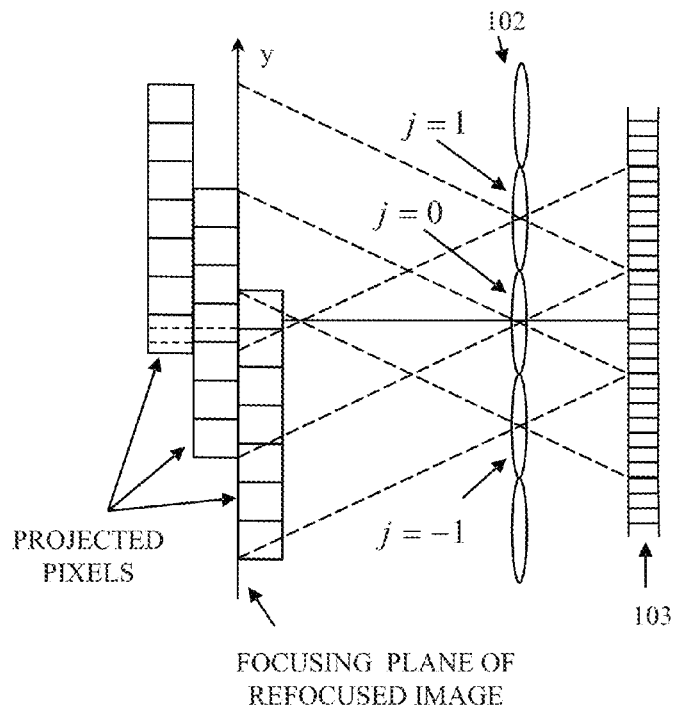

FIG. 5A is an enlarged view of part of the image pickup optical system shown in FIG. 2, which shows a relation among the lens array 102, the image sensor 103 and the focusing plane of the refocused image. Broken lines in FIG. 5A show a field angle of each lens cell constituting the lens array 102. FIG. 5B shows pixels of the image sensor 103 projected onto the focusing plane of the refocused image through the lens cells. As understood from FIG. 5B, the pixels (in other words, a pixel set including a plurality of pixels) projected onto the focusing plane of the refocused image through the lens cells adjacent to each other are overlapped each other. Combining the overlapped projected pixels provides, on the focusing plane of the refocused image, an image focused on the object side plane conjugate with the focusing plane of the refocused image through the imaging optical system 101.

When the focusing plane of the refocused image coincides with the image side conjugate plane 202, an image focused on the object plane 201 is produced. However, as mentioned above, the refocusing range has a limitation which requires that the focusing plane of the refocused image is within a range from $\alpha_+ s_2$ to $\alpha_- s_2$ from the image side principal plane of the imaging optical system 101. That is, if the focusing plane of the refocused image is disposed outside the range from $\alpha_+ s_2$ to $\alpha_- s_2$, it is impossible to acquire a correct refocused image.

As shown in FIG. 5B, the projected pixels overlapping one another on the focusing plane of the refocused image are shifted to one another in a direction parallel to the focusing plane. Combining such projected pixels shifted to one another enables decrease in apparent pixel size, which is referred to as "pixel-shifting super-resolution"

Figure 5C:
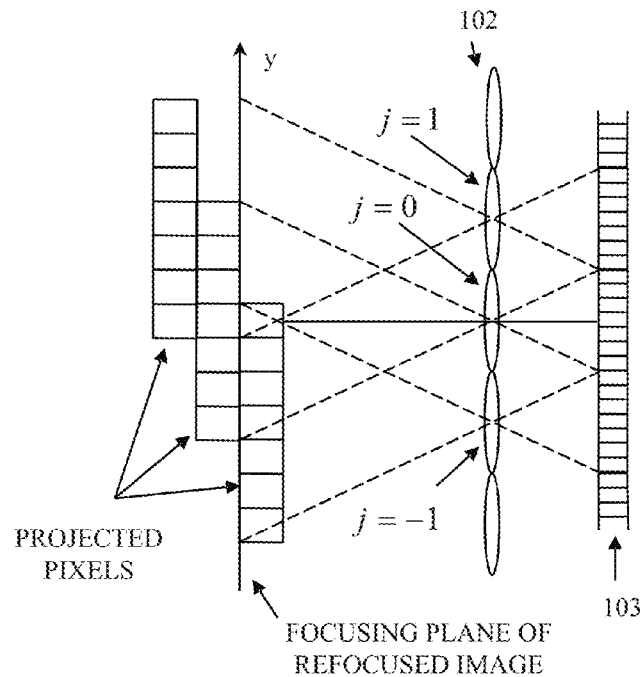

On the other hand, when the projected pixels overlapping one another are not shifted to (that is, coincide with) one another as shown in FIG. 5C, an effect of the pixel-shifting super-resolution cannot be obtained, which makes it impossible to increase resolution. A shift amount of the projected pixels (hereinafter referred to as "a pixel shift amount) overlapping one another changes depending on position of the focusing plane of the refocused image onto which the pixels are projected, so that there is a focus position where no effect of the pixel-shifting super-resolution is obtained. Most increase of the resolution by the pixel-shifting super-resolution is achieved when a ratio of the shift of the projected pixels (hereinafter referred to as "a pixel shift ratio") corresponds to number of the projected pixels overlapping one another. Specifically, in FIG. 5B, the number of the overlapping projected pixels is three, and therefore a pixel shift ratio of 1/3 or 2/3 can achieve highest resolution. A relation between the pixel shift ratio and the number of the overlapping projected pixels will be described in detail later.

Next, specific description will be made of a relation between the focusing plane of the refocused image and the pixel-shifting super-resolution. First, description will be made of a case where the focusing plane of the refocused image coincides with the image side conjugate plane 202 of the imaging optical system 101 with respect to the object plane 201. A relation between a distance $\sigma_1$ and the pixel shift ratio is calculated as follows.

A relative pixel shift amount g by the adjacent lens cells is expressed as follows as a value (ratio) obtained by dividing an arrangement pitch $\Delta_{LA}$ of the lens cells by an arrangement pitch $\Delta\sigma_1/\sigma_2$ of the pixels projected onto the image side conjugate plane 202 of the imaging optical system 101:

$$|\Delta_{LA}\sigma_2/(\Delta\sigma_1)|$$

where Δ represents the pixel pitch of the image sensor 103.

The arrangement pitch $\Delta_{LA}$ of the lens cells is hereinafter referred to as "a lens cell pitch", and the arrangement pitch $\Delta\sigma_1/\sigma_2$ of the projected pixels is hereinafter referred to as "a projected pixel pitch".

Figure 6:
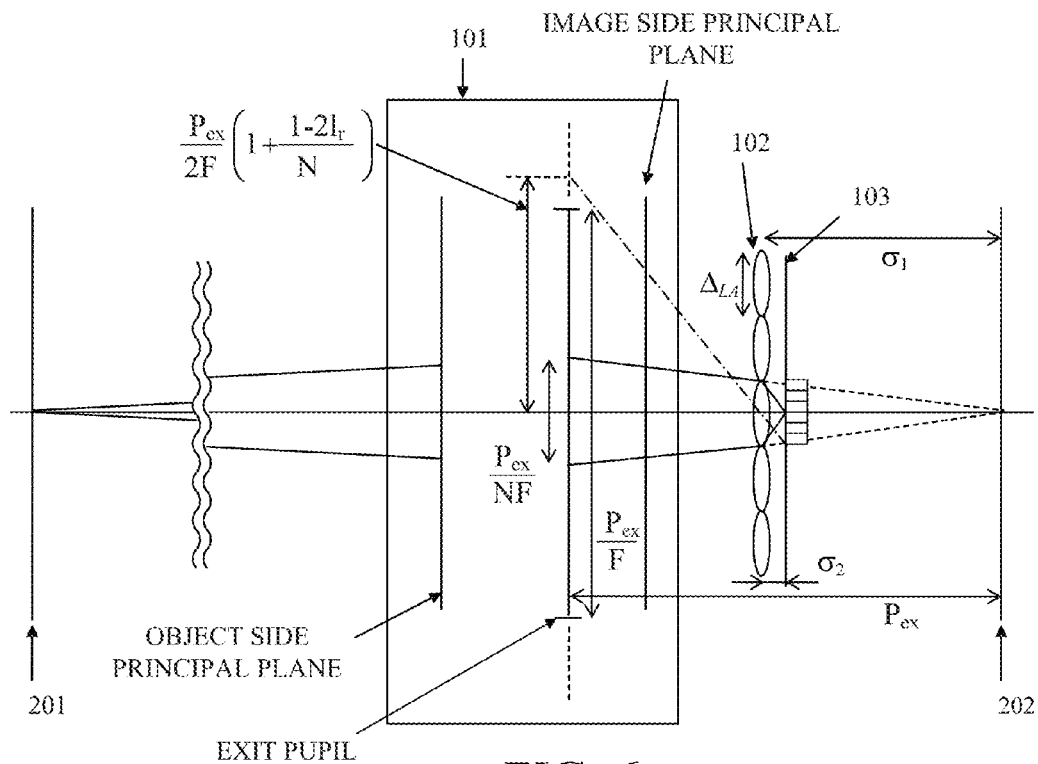
FIG. 6 shows a relation of parameters in each embodiment.

Next, in order to describe a relation between an arrangement of the lens array 102 and the relative pixel shift amount g by the adjacent lens cells, description of a relation among the distance $\sigma_1$, the distance $\sigma_2$ and the pixel shift amount will be made with reference to FIG. 6. FIG. 6 shows the image pickup optical system shown in FIG. 1 in more detail. The following description applies also to the image pickup optical system shown in FIG. 2.

In FIG. 6, F represents an F-number of the imaging optical system 101, and $P_{ex}$ represents a distance between the exit pupil (paraxial exit pupil) of the imaging optical system 101 and the image side conjugate plane 202 of the imaging optical system 101 with respect to the object plane 201. Moreover, N represents a positive real number, which shows one-dimensional division number of the pupil plane of the imaging optical system 101. Furthermore, $P_{ex}/(NF)$ represents a sampling pitch of angle information of light rays acquired by the image sensor 103. As understood from FIG. 6, the lens cell pitch $\Delta_{LA}$ and the distance $\sigma_1$ have a relation shown by the following expression (2):

$$\Delta_{LA} = \left|\frac{\sigma_1}{NF}\right| \qquad (2)$$

The distance $\sigma_1$ becomes a positive value when the object side principal plane of the lens array 102 is located on the further front side than the image side conjugate plane 202 and becomes a negative value when the object side principal plane is located on the further rear side than the image side conjugate plane 202. A dashed-dotted line in FIG. 6 is a straight line connecting a center of one lens cell of the lens array 102 and one end of the pixel set corresponding to that lens cell. A distance between an intersection of the straight line with the pupil plane and a center of the pupil is given by the following expression (3):

$$\frac{P_{ex}}{2F}\left(1 + \frac{1-2l_r}{N}\right) \qquad (3)$$

where $l_r$ represents a parameter showing a degree of a dead zone and crosstalk on the image sensor 103.

Figures 7A, 7B:
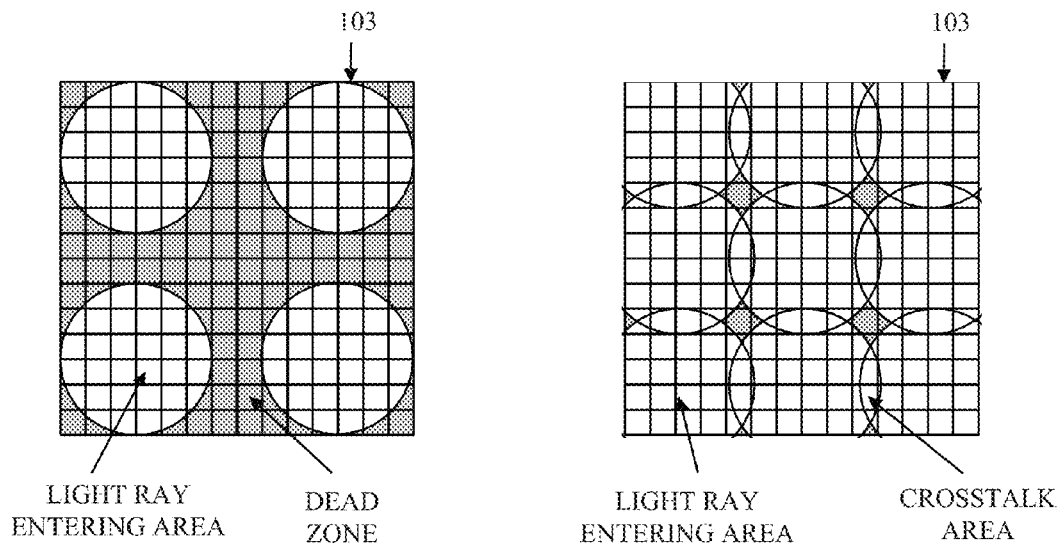
FIGS. 7A and 7B show optical images formed on an image sensor in each embodiment.

Description of the dead zone and the crosstalk will be made with reference to FIGS. 7A and 7B. FIG. 7A shows optical images formed on the image sensor 103 when the degree $l_r$ is a negative value. Each of white areas shows an area where light rays enter the image sensor 103, and a gray area shows the dead zone, that is, an area where light rays do not enter the image sensor 103. As the degree $l_r$ becomes smaller, the dead zone increases. Since the increase of the dead zone means increase of pixels not acquiring information, it is desirable that the dead zone decrease as much as possible.

FIG. 7B shows optical images formed on the image sensor 103 when the degree $l_r$ is a positive value. As understood from this figure, the optical images formed by the different lens cells overlap one another. In each overlapping area (crosstalk area), light rays coming from mutually different positions on the object plane 201 and having mutually different angles thereon enter a same pixel. This phenomenon is called the crosstalk. As the degree $l_r$ increases, the crosstalk area increases.

Pixels where such crosstalk is generated cannot acquire the light field, and therefore using such pixels for image reconstruction makes it impossible to produce a correct reconstructed image. On the other hand, when not using the pixels where the crosstalk is generated, as the crosstalk area increases, number of pixels unable to be used for the image reconstruction increases. Therefore, it is desirable that the crosstalk area decrease as much as possible. When the degree $l_r$ is 0, generation of the dead zone and crosstalk is most suppressed.

However, in a real system, even if the degree $l_r$ is slightly shifted from 0, the generation of the dead zone and crosstalk may be suppressed due to shift of a best focus position caused by aberration and due to vignetting or peripheral light falloff of the imaging optical system 101.

The following expression (4) is derived from FIG. 6 and the expression (3):

$$\frac{N+1-2l_r}{N} \cdot \frac{P_{ex}\sigma_2}{2F(P_{ex}-\sigma_1)} = \frac{\Delta_{LA}}{2} \qquad (4)$$

Thus, the relative pixel shift amount g by the adjacent lens cells is given by the following expression (5) derived from the expressions (2) and (4):

$$g = \frac{\Delta_{LA}}{\Delta|\sigma_1/\sigma_2|} = \frac{1}{N(N+1-2l_r)F}\left|\frac{\sigma_1}{\Delta}\right|\left(1 - \frac{\sigma_1}{P_{ex}}\right) \qquad (5)$$

Figure 8:
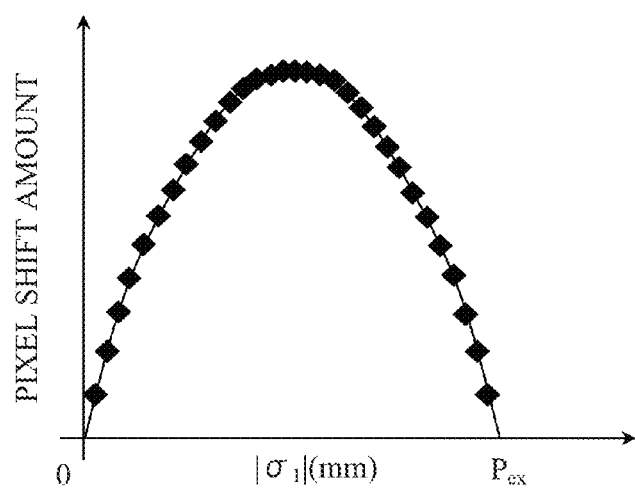
FIG. 8 shows a relation between a distance $\sigma_1$ and a pixel shift amount in each embodiment.

The expression (5) thus obtained shows the relation of the pixel shift amount g with respect to the distance $\sigma_1$. As understood from the expression (5), the pixel shift amount g is expressed by a quadratic function of the distance $\sigma_1$. In the image pickup optical system shown in FIG. 1, the pixel shift amount g is expressed as shown in FIG. 8. Each of rhombic points in FIG. 8 shows a distance (solution) at which number of pixels of the pixel set corresponding to the lens cell becomes an integer. Distances $\sigma_1$ other than these solutions cause the above-described crosstalk.

However, providing a light-blocking surface (wall) in the image sensor 103 in order to prevent the pixel set corresponding to a certain lens cell from receiving light rays passing through other lens cells enables suppression of generation of the crosstalk even though the number of pixels of that pixel set corresponding to the certain lens cell is not an integer. A pixel shift corresponding to an integral multiple of the pixel has no meaning as shown in FIG. 5C, and therefore a pixel shift amount g as an integral value calculated by the expression (5) may be disregarded. Thus, a ratio δ of the pixel shift (hereinafter referred to as "a pixel shift ratio") is expressed by the following expression (6):

$$\delta = \mathrm{mod}\left(\left|\frac{\Delta_{LA}\sigma_2}{\Delta\sigma_1}\right|, 1\right) \qquad (6)$$

where $z=\mathrm{mod}(x,y)$ means that z is equal to a reminder of division of x by y.

The expression (6) shows the pixel shift ratio when the focusing plane of the refocused image coincides with the image side conjugate plane 202 of the imaging optical system 101 with respect to the object plane 201. In order to producing a refocused image focused on an arbitral focusing plane, it is only necessary to change position of the focusing plane of the refocused image. Thus, the pixel shift amount g and the pixel shift ratio δ shown by the expressions (5) and (6) are rewritten for the arbitral focusing plane as shown by the following expressions (7) and (8):

$$g = \frac{\Delta_{LA}\sigma_2}{\Delta|\tau|} \qquad (7)$$

$$\delta = \mathrm{mod}\left(\left|\frac{\Delta_{LA}\sigma_2}{\Delta\tau}\right|, 1\right) \qquad (8)$$

where τ represents a distance from the object side principal plane of the lens array 102 to an object side conjugate plane of the imaging optical system 101 with respect to the focusing plane (focusing position) on which the refocused image is to be focused. As understood from the expression (7), the distance τ to the focusing plane of the refocused image and the pixel shift amount g have an inverse relation.

Figure 9:
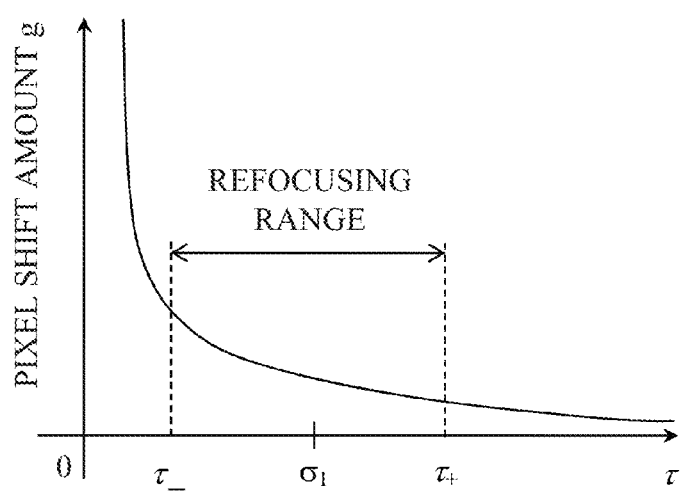
FIG. 9 shows a relation between a distance $\tau$ and the pixel shift amount in each embodiment.

FIG. 9 shows the relation between the distance τ and the pixel shift amount g, where $\tau_+$ and $\tau_-$ respectively represent an upper limit and a lower limit of the refocusing range decided from the expression (1); the upper and lower limits are expressed by the following expression (9) by using $\Delta u = P_{ex}/(NF)$ and $\Delta \ll P_{ex}$:

$$\tau_\pm = \sigma_1 \pm NF\epsilon \quad (9)$$

Figure 10:
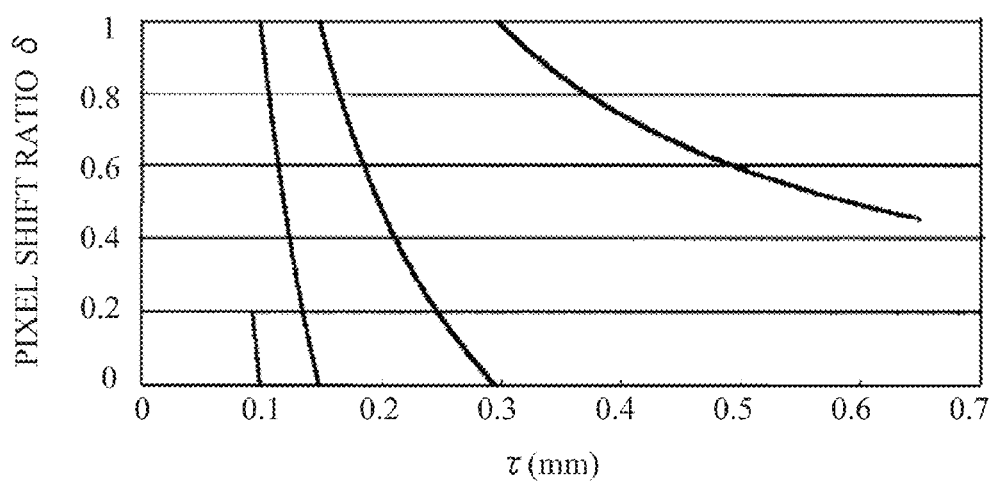
FIG. 10 shows an example of a ratio of the distance $\tau$ and the pixel shift amount in each embodiment.

FIG. 10 shows a relation between the pixel shift ratio δ and the distance τ calculated by the expression (8) when using parameters of Numerical Example 3 described later. In FIG. 10, $\epsilon = 3\Delta$.

The description was made of the relation between the focusing position of the refocused image and the pixel shift amount. Next, description will be made of the conditions required for acquiring high resolution refocused images focused on a lot of focusing positions.

For example, when the number of the overlapping projected pixels is three, the pixel shift ratio δ providing a high resolution refocused image is 1/3 or 2/3. As shown in FIG. 9, the pixel shift amount g continuously decreases monotonously as the distance τ increases. Therefore, as a difference between the pixel shift amount g at the distance $\tau_-$ (hereinafter shown by $g(\tau_-)$) and the pixel shift amount g at the distance $\tau_+$ (hereinafter shown by $g(\tau_+)$) increases, number of points where a high resolution refocused image is obtained in the refocusing range, that is, where the pixel shift ratio δ becomes 1/3 or 2/3 increases. Consequently, disposing the lens array 102 such that a value of $g(\tau_-) - g(\tau_+)$ shown by the following expression (10) becomes large increases the number of focusing positions where high resolution refocused images are obtained by the pixel-shifting super-resolution.

$$g(\tau_-) - g(\tau_+) = \frac{\Delta_{LA}\sigma_2}{\Delta}\left(\frac{1}{|\tau_-|} - \frac{1}{|\tau_+|}\right) = 2\frac{\varepsilon}{\Delta}\left|\frac{\sigma_2}{\sigma_1}\right|\frac{1}{1-(\varepsilon/\Delta_{LA})^2} \quad (10)$$

As understood from the expression (10), as a value of $1-(\epsilon/\Delta_{LA})^2$ decreases, the value of $g(\tau_-)-g(\tau_+)$ increases.

The diameter ε of the permissible circle of confusion corresponding to the spatial resolution of the refocused image is decided depending on necessary performance, but cannot be smaller than the pixel pitch Δ of the image sensor 103. In order to decrease the value of $1-(\epsilon/\Delta_{LA})^2$, it is necessary that a value obtained by division of ε by the lens cell pitch $\Delta_{LA}$ of the lens array 102 become closer to 1. A value of the diameter ε providing a highest resolution refocused image is its minimum value equal to A. Therefore, when replacing ε by Δ, as a value $(\Delta/\Delta_{LA})$ obtained by dividing Δ by $\Delta_{LA}$ becomes closer to 1, the value of $g(\tau_-)-g(\tau_+)$ increases. Moreover, as the value $(\Delta/\Delta_{LA})$ becomes closer to 1, the lens array 102 is located closer to the image side conjugate plane 202 and thereby the value of $|\sigma_2/\sigma_1|$ increases, so that the value of $g(\tau_-)-g(\tau_+)$ increases. Accordingly, in the above-mentioned example, number of the focusing position at which the pixel shift ratio δ becomes 1/3 or 2/3 and thereby high resolution refocused image can be obtained increases.

In the example shown in FIG. 10, the number of the focusing position at which the pixel shift ratio δ becomes 1/3 or 2/3 is five. The value of $\Delta/\Delta_{LA}$ equal to or more than 0.04 increases the value of $g(\tau_-)-g(\tau_+)$, which increases the number of the focusing position at which the high resolution refocused images can be obtained by pixel-shifting super-resolution increases. This relation applies not only to the case where $\epsilon=\Delta$, but also to a case where ε is somewhat greater than Δ. Therefore, a lens cell pitch of the lens array 102 of 25 times or less of the pixel pitch of the image sensor 103 makes it possible to provide in the refocusing range a lot of focusing positions (hereinafter each referred to as "a high resolution focusing position") on which high resolution refocused images can be focused.

It is desirable to set the lens cell pitch to 14 times or less of the pixel pitch of the image sensor 103, which makes it possible to provide in the refocusing range a more number of the high resolution focusing positions.

It is more desirable to set the lens cell pitch to 10 times or less of the pixel pitch of the image sensor 103, which makes it possible to provide in the refocusing range a sufficient number of the high resolution focusing positions.

Next, bringing the lens array 102 closer to the image side conjugate plane 202 means using a range of the distance $\sigma_1$ in which a slope of the pixel shift amount shown in FIG. 8 is steep. Thus, disposing the lens array 102 so as to satisfy a condition expressed by the following expression (11) increases the value of $g(\tau_-)-g(\tau_+)$, which increases the number of the high resolution focusing positions in the refocusing range.

$$0.0 < \left|\frac{\sigma_1}{P_{ex}}\right| < 0.1 \quad (11)$$

A value of $|\sigma_1/P_{ex}|$ exceeding the upper limit of the expression (11) decreases the value of $g(\tau_-)-g(\tau_+)$, which undesirably decreases the number of the high resolution focusing positions in the refocusing range. The value of $|\sigma_1/P_{ex}|$ cannot theoretically decrease below the lower limit of the expression (11).

It is desirable to satisfy the following expression (11a), which can further increase the number of the high resolution focusing positions in the refocusing range.

$$0.00 < \left|\frac{\sigma_1}{P_{ex}}\right| < 0.06 \quad (11a)$$

It is more desirable to satisfy the following expression (11b), which can still further increase the number of the high resolution focusing positions in the refocusing range.

$$0.00 < \left|\frac{\sigma_1}{P_{ex}}\right| < 0.04 \quad (11b)$$

Moreover, according to the above-described method of producing the refocused image, as understood from FIG. 5C, when the distance |τ| is shorter than the distance $\sigma_2$, field angles of the adjacent lens cells do not overlap each other, which makes it impossible to produce the high resolution refocused image. In order to make the distance |τ| not shorter than the distance $\sigma_2$, it is necessary that a distance $|\tau_-|$ be longer than the distance $\sigma_2$, and thereby the following expression (12) is derived:

$$1 - \left|\frac{\sigma_2}{\sigma_1}\right| \geq \frac{\varepsilon}{\Delta_{LA}} \quad (12)$$

Since the minimum value of $\varepsilon$ is $\Delta$, a condition shown by the following expression (13) is derived from the expression (12). In other words, it is desirable to satisfy the condition shown by the following expression (13):

$$1.0 \leq \frac{\Delta_{LA}}{\Delta}\left(1 - \left|\frac{\sigma_2}{\sigma_1}\right|\right) \leq 30.0 \quad (13)$$

If a value of $(\Delta_{LA}/\Delta)(1-|\sigma_2/\sigma_1|)$ is below the lower limit of the expression (13), a partial range where the distance $|\tau|$ is shorter than the distance $\sigma_2$ exists in the refocusing range, which narrows the refocusing range where the high resolution refocused images can be produced. On the other hand, if the value of $(\Delta_{LA}/\Delta)(1-|\sigma_2/\sigma_1|)$ exceeds the upper limit of the expression (13), the value of $g(\tau_-)-g(\tau_+)$ becomes small, which decreases the high resolution focusing positions.

It is more desirable to satisfy the condition shown by the following expression (13a), which can increase the number of the high resolution focusing positions while preventing narrowing of the refocusing range.

$$1.0 \leq \frac{\Delta_{LA}}{\Delta}\left(1 - \left|\frac{\sigma_2}{\sigma_1}\right|\right) \leq 20.0 \quad (13a)$$

It is still more desirable to satisfy the condition shown by the following expression (13b), which can further increase the number of the high resolution focusing positions while preventing narrowing of the refocusing range.

$$1.0 \leq \frac{\Delta_{LA}}{\Delta}\left(1 - \left|\frac{\sigma_2}{\sigma_1}\right|\right) \leq 10.0 \quad (13b)$$

Next, description will be made of the spatial resolution including the pixel-shifting super-resolution in the refocusing range. First, estimation of the number of the projected pixels is made.

Figure 11:
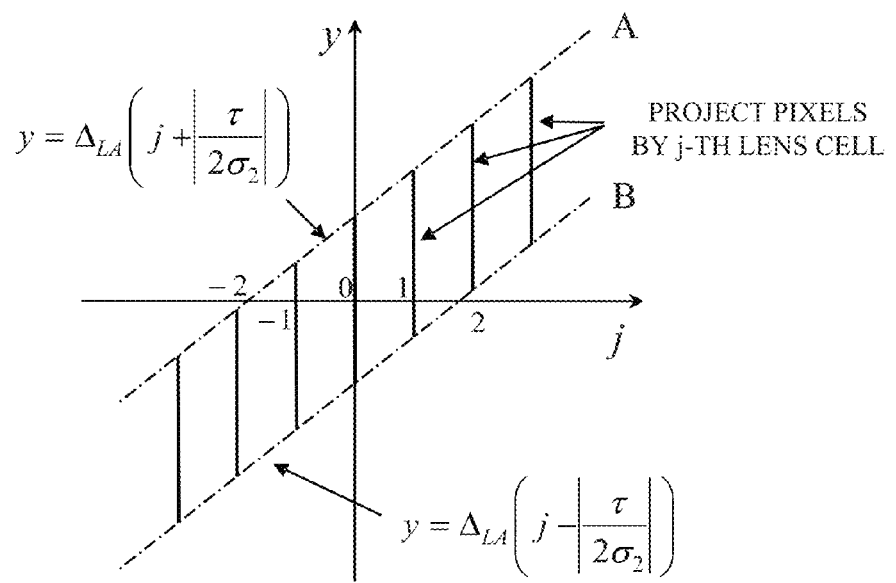
FIG. 11 shows an overlapping pixel number in each embodiment.

FIG. 11 shows a graph whose horizontal axis indicates a number j of the lens cell constituting the lens array 102 shown in FIG. 5B and whose vertical axis shows a y-coordinate on the focusing plane of the refocused image. A lens cell to which j=0 is allocated may be an arbitral lens cell of the lens array 102. Straight lines parallel to a y-axis in FIG. 11 show coordinates of the projected pixels when projecting the pixel set corresponding to a j-th lens cell onto the focusing plane of the refocused image. A dashed-dotted line A connects upper ends of these straight lines, and a dashed-dotted line B connects lower ends thereof.

The dashed-dotted line A is expressed by the following expression:

$$y=\Delta_{LA}[j+|\tau/(2\sigma_2)|]$$

The dashed-dotted line B is expressed by the following expression:

$$y=\Delta_{LA}[j-|\tau/(2\sigma_2)|]$$

The number of the overlapping projected pixels (hereinafter referred to as "an overlapping pixel number") corresponds to an interval between the dashed-dotted lines A and B in a direction of j. For the lens cell of j=0, pixels making the overlapping pixel number minimum are ones near y=0, and the overlapping pixel number is estimated as about $|\tau/\sigma_2|$.

Next, description of the spatial resolution including the pixel-shifting super-resolution will be made. In an ideal system, when n projected pixels mutually shifted by 1/n overlap one another, the resolution increases to n times (n represents an integer). However, in a real system, an increase amount of the resolution by the pixel-shifting super-resolution becomes smaller than that in the ideal system due to noise or due to aberration of the imaging optical system. In the following description, however, for simplification of description, increase of the resolution in the ideal systems will be described. A final resolution is defined as being decided by a pixel whose size is maximum among pixels whose apparent sizes are decreased by the pixel-shifting super-resolution. The maximum size thereof is referred to as "an apparent maximum pixel size".

For example, in a case where the overlapping pixel number is 8 and the pixel shift ratio $\delta$ obtained by the adjacent lens cells is 0.45, eight adjacent lens cells cause pixel shifts of 0, 0.45, 0.90, 0.35, 0.80, 0.25, 0.70 and 0.15. In this case, the apparent maximum pixel size deciding the resolution is 0.25 (=0.70−0.45).

On the other hand, in a case where the overlapping pixel number is 8 and the pixel shift ratio $\delta$ is 3/8, the eight adjacent lens cells cause pixel shifts of 0, 3/8, 6/8, 1/8, 4/8, 7/8, 2/8 and 5/8. In this case, the apparent maximum pixel size is 1/8, which coincides with an inverse of the overlapping pixel number. Therefore, a maximum effect of the pixel-shifting super-resolution is obtained.

This applies also to cases where the pixel shift ratios $\delta$ expressed by the expression (8) are 1/8, 5/8 and 7/8. However, in cases where the pixel shift ratios $\delta$ expressed by the expression (8) are 2/8, 4/8 and 6/8, the effect of the pixel-shifting super-resolution is decreased.

In the case where, for example, the pixel shift ratio $\delta$ is 2/8, the eight adjacent lens cells cause pixel shifts of 0, 2/8, 4/8, 6/8, 0, 2/8, 4/8 and 6/8, and the apparent maximum pixel size becomes 1/4 (=2/8) because the pixels overlap one another. Thus, in this case, the effect of the pixel-shifting super-resolution is decreased to half of those in the cases where the pixel shift ratios $\delta$ are 1/8, 3/8, 5/8 and 7/8.

As understood from the above description, when the pixel shift ratio $\delta$ given by the expression (8) is equal to $m_0/M_0$ ($M_0$ represents the overlapping pixel number, and $m_0$ represents an integer smaller than $M_0$ and having a greatest common divisor with $M_0$ of 1), the maximum effect of the pixel-shifting super-resolution is obtained. The overlapping pixel number $M_0$ can be estimated as about $|\tau/\sigma_2|$ as described above, and as the pixel shift ratio $\delta$ becomes closer to $m_0/M_0$, the effect of the pixel-shifting super-resolution increases.

Figure 12:
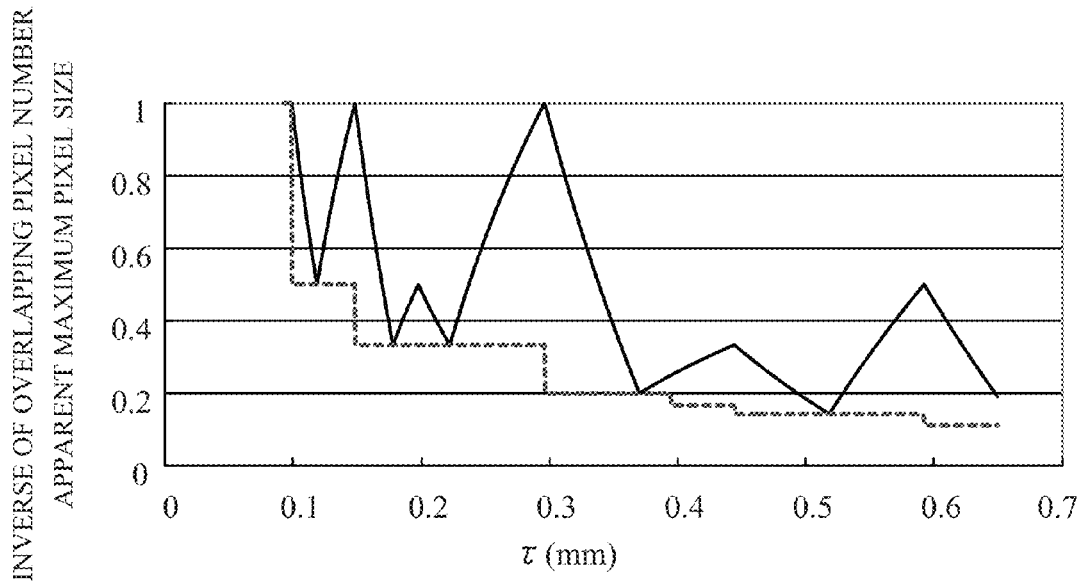
FIG. 12 shows an example of an apparent maximum pixel size and an inverse of the overlapping pixel number at various distances $\tau$.

FIG. 12 shows the apparent maximum pixel size (shown by a solid line) and the inverse of the overlapping pixel number (shown by a dotted line) at various distances $\tau$ in a case of using the same parameters as those shown in FIG. 10. At distances $\tau$ at which the apparent maximum pixel size is closer to the inverse of the overlapping pixel number, a higher effect of the pixel-shifting super-resolution can be obtained and therefore the resolution of the reconstructed (refocused) image increases. Conversely, at distances $\tau$ at which the apparent maximum pixel size is away from the inverse of the overlapping pixel number, such a higher effect of the pixel-shifting super-resolution cannot be obtained.

Figure 13:
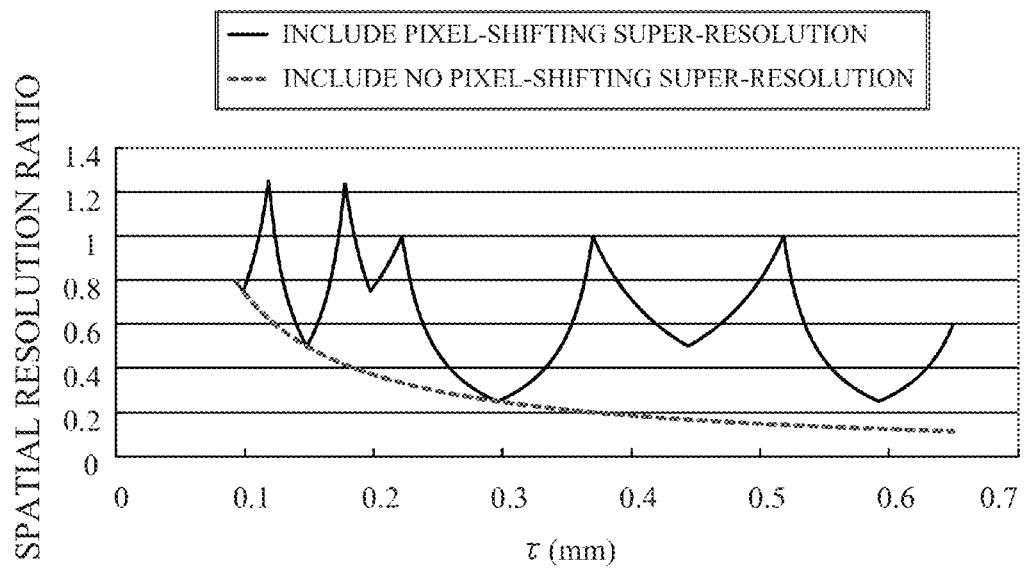
FIG. 13 shows an example of a relation between the distance $\tau$ and a spatial resolution ratio.

FIG. 13 shows a spatial resolution ratio at various distances $\tau$ in the case of using the same parameters as those shown FIG. 10. The spatial resolution ratio shown by a vertical axis is obtained by normalizing the spatial resolution of the reconstructed image by number of pixels of the image sensor. As understood from FIG. 13, at the distances τ at which the apparent maximum pixel size is closer to the inverse of the overlapping pixel number in FIG. 12, a higher spatial resolution including the pixel-shifting super-resolution can be obtained. Conversely, at distances τ at which the apparent maximum pixel size is close to 1 in FIG. 12, little increase of the spatial resolution by the pixel-shifting super-resolution is obtained.

In Embodiments 1 and 2, the lens array 102 is brought closer to the image side conjugate plane 202, and thereby number of peaks of the solid line shown in FIG. 12 is increased. Moreover, in a range where the distance τ is short, the resolution without considering the pixel-shifting super-resolution shown by the broken line is increased. This increase of the resolution is caused by that the lens array 102 is brought closer to the image side conjugate plane 202 and thereby a magnification ratio $|\tau_-/\sigma_2|$ of the projected pixels projected onto the focusing plane of the refocused image becomes closer to 1.

As mentioned above, in the real system, the effect of the pixel-shifting super-resolution becomes smaller than that in the ideal system due to the noise and the aberration. Thus, in the real system, the spatial resolution ratio becomes smaller than that shown by the solid line in FIG. 13. Therefore, in order to make the resolution of the reconstructed image high, it is desirable that the resolution without considering the pixel-shifting super-resolution be high. Accordingly, bringing the lens array 102 closer to the image side conjugate plane 202 achieves the increase of the resolution of the refocused image in the range where the distance $|\tau|$ is short.

In addition, an image side (image sensor side) surface of each of the lens cells constituting the lens array 102 is desirable to be a convex surface. The convex surface suppresses astigmatism generated in the lens array 102, which makes the image obtained by the image sensor 103 sharp. Conversely, not using the convex surface as the image side surface of each lens cell increases the astigmatism, which blurs a peripheral part of the image obtained through the lens cell. Using such a blurred part of the image for the reconstruction process makes the reconstructed image unsharp.

Furthermore, an object side (object plane side) surface of each of the lens cells constituting the lens array 102 is desirable to be a planar surface or a convex surface. The planar or convex surface reduces a curvature of the object side surface of the lens cell and thereby suppresses generation of aberration, which makes it possible to increase sharpness of the image.

In the image pickup optical system shown in FIG. 1, the lens array 102 and the image sensor 103 are disposed on a further object side (that is, disposed closer to the object plane 201) than the image side conjugate plane 202 of the imaging optical system 101 with respect to the object plane 201. This configuration makes it possible to reduce a total optical system length as compared with that of the image pickup optical system in which the lens array 102 and the image sensor 103 are disposed on the opposite side to the object plane 201 with respect to the image side conjugate plane 202 as shown in FIG. 2. Moreover, the image pickup optical system of FIG. 1 makes an image height of off-axis light rays entering the lens array 102 and the image sensor 103 smaller than that of the image pickup optical system shown in FIG. 2. Therefore, employing the configuration shown in FIG. 1 enables miniaturization of the image pickup optical system.

As described above, each of the image sensor 103 of the image pickup optical systems of Embodiments 1 and 2 enables provision of the image in which the plurality of small images whose image capturing view points and image capturing areas are mutually different are two-dimensionally arranged. Performing the reconstruction process such as overlapping of the small images shifted entirely or partially makes it possible to acquire not only a refocused image whose focusing position is changed, but also a reconstructed image whose depth of field or view point is changed. Though a detailed description is omitted here, using a reconstructing method similar to that described in, for example, Ren Ng, et al., "Light Field Photography with a Hand-held Plenoptic Camera" Stanford Tech Report CTSR 2005-02 makes it possible to produce the reconstructed image. In the production of the reconstructed image, using the pixel-shifting super-resolution enables increase of resolution of the reconstructed image.

As described above, each of Embodiments 1 and 2 enables realization of an image pickup apparatus capable of providing high resolution refocused images focused on a lot of focusing positions while having a simple configuration that sets the lens cell pitch of the lens array 102 to 25 times or less of the pixel pitch of the image sensor 103.

Although each of Embodiments 1 and 2 described the case where the reconstruction process is performed by the image processor 105 provided inside the image pickup apparatus, the reconstruction process may be performed by an image processing apparatus separate from the image pickup apparatus. For example, the following configuration may be employed. A personal computer is used as the image pickup apparatus, and image data before the reconstruction process acquired by an image pickup apparatus is input to the personal computer via a recording medium, a wired or wireless communication, or an internet connection. Then, the personal computer acquiring the image performs the reconstruction process according to an image processing program (computer program) and outputs a resulting reconstructed image.

In addition, it is not necessarily needed that a person or an object exists on the object plane 201 shown in FIGS. 1 and 2. This is because refocusing on persons or objects nearer or farther than the object plane 201 can be made after image capturing.

The pixel-shifting super-resolution may be used for not only the reconstruction process to produce the refocused image, but also a reconstruction process to produce a reconstructed image whose view point or depth of field is changed. Furthermore, in the reconstruction process, an image estimation technique such as a MAP (maximum a posteriori) estimation method may be used to further increase the resolution.

Next, specific numerical examples of Embodiments 1 and 2 will be described.

NUMERICAL EXAMPLE 1

Figure 14:
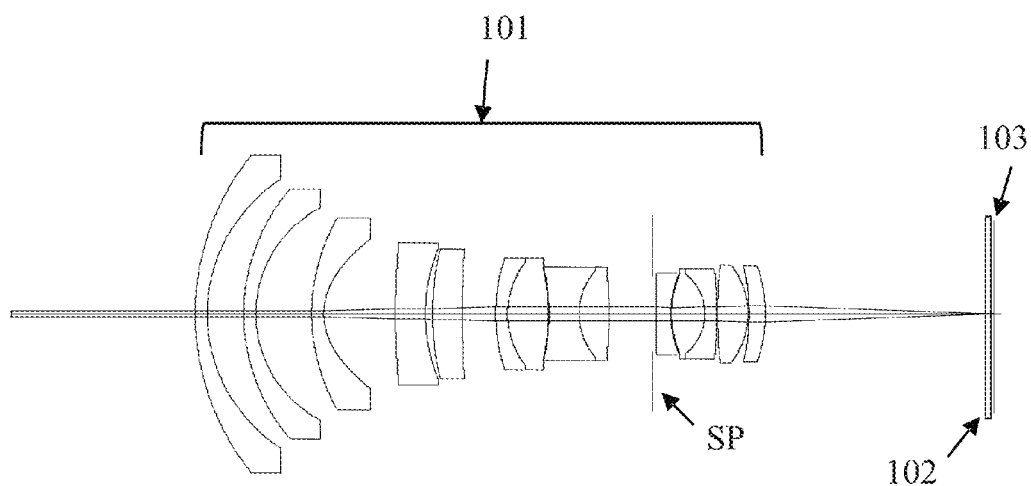
FIG. 14 is a sectional view of the image pickup optical system in Numerical Example 1.

FIG. 14 shows a configuration of an image pickup optical system that is Numerical Example 1 corresponding to Embodiment 1, which includes an imaging optical system 101, a lens array 102 and an image sensor 103. The imaging optical system 101 is a fixed focal length lens and includes an aperture stop SP that controls an F-number. An aperture diameter of the aperture stop SP when performing image capturing is desirable to be large in order to acquire more parallax information. The aperture diameter may be fixed since the F-number is changed by the reconstruction process after the image capturing.

Moreover, the imaging optical system 101 is provided with at least one of an autofocusing (AF) mechanism and a manual focusing mechanism which are not shown, and position of a focus lens (focus position) is controlled through the focusing mechanism. When the aperture diameter of the aperture stop SP is finite, the parallax information acquired by the image sensor 103 to be used for refocusing by the reconstruction process is also finite. Thus, the refocusing range is also finite. Changing the focus position at a time of image capturing enables shift of the refocusing range in a direction of a depth of field.

Each of lens cells constituting the lens array 102 is a spherical solid lens having a positive refractive power and whose object side and image side surfaces are convex surfaces. Any one of the object side and image side surfaces of each lens cell may be a planar surface or an aspheric curved surface. The lens array 102 views an optical image formed by the imaging optical system 101 as a virtual object and forms another optical image of the virtual object on the image sensor 103.

In this numerical example, the distance $P_{ex}$ from the exit pupil of the imaging optical system 101 to the image side conjugate plane 202 thereof is 63.4909 (mm), the lens cell pitch $\Delta_{LA}$ of the lens array 102 is 0.1032 (mm), and the pixel pitch $\Delta$ of the image sensor 103 is 0.0043 (mm). Moreover, the lens array 102 is disposed at a position where the distance $\sigma_1$ becomes 2.0805 (mm) and the distance $\sigma_2$ becomes 0.2795 (mm). Values of the conditional expressions (11) and (13) in this configuration are shown in Table 1.

The image side refocusing range is decided by the diameter $\epsilon$ of the permissible circle of confusion, and the diameter $\epsilon$ is decided depending on necessary performance. In this numerical example, for example when $\epsilon=4.65\Delta$, the image side refocusing range is $\tau_{\pm}=\sigma_1\pm0.4032$ (mm).

This numerical example can provide eight focusing positions at which the resolution becomes maximum (referred to as "high resolution focusing positions" in Numerical Examples 1 to 4) in the refocusing range. Furthermore, since the resolution without considering the pixel-shifting super-resolution increases near the distance $\tau_-$, final resolution of the refocused image, which includes the pixel-shifting super-resolution and influence of noise or the like, increases. Therefore, this numerical example can achieve an image pickup apparatus capable of providing more number of the high resolution focusing positions as compared with conventional image pickup apparatuses.

NUMERICAL EXAMPLE 2

Figure 15:
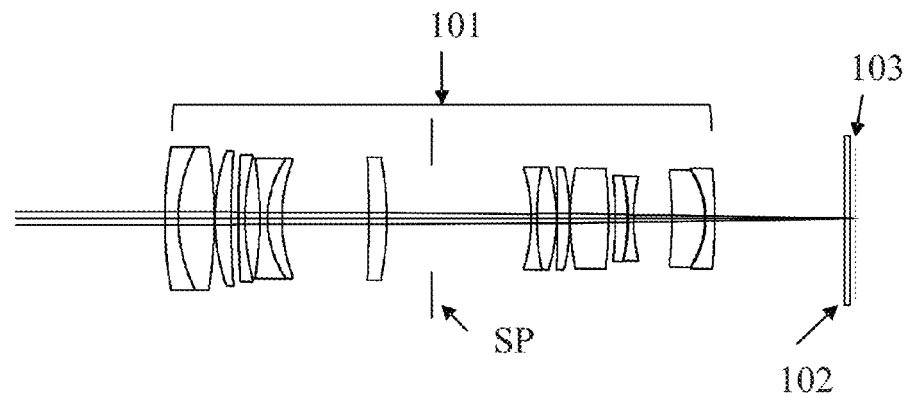
FIG. 15 is a sectional view of the image pickup optical system in Numerical Example 2.

FIG. 15 shows a configuration of an image pickup optical system that is Numerical Example 2 corresponding to Embodiment 1, which includes an imaging optical system 101, a lens array 102 and an image sensor 103. The imaging optical system 101 is a fixed focal length lens. Each of the lens cells constituting the lens array 102 has an object side planar surface and an image side convex surface. The lens array 102 views an optical image formed by the imaging optical system 101 as a virtual object and forms another optical image of the virtual object on the image sensor 103.

In this numerical example, the distance $P_{ex}$ from the exit pupil of the imaging optical system 101 to the image side conjugate plane 202 thereof is 93.5127 (mm), the lens cell pitch $\Delta_{LA}$ of the lens array 102 is 0.0430 (mm), and the pixel pitch $\Delta$ of the image sensor 103 is 0.0043 (mm). Moreover, the lens array 102 is disposed at a position where the distance $\sigma_1$ becomes 1.1223 (mm) and the distance $\sigma_2$ becomes 0.1232 (mm). Values of the conditional expressions (11) and (13) in this configuration are shown in Table 1.

In this numerical example, for example when $\epsilon=3\Delta$, the image side refocusing range is $\tau_{\pm}=\sigma_1\pm0.3251$ (mm).

This numerical example can provide five high resolution focusing positions in the refocusing range. This numerical example can achieve, since the resolution of the refocused image increases near the distance $\tau_-$ as well as in Numerical Example 1, an image pickup apparatus capable of providing more number of the high resolution focusing positions as compared with conventional image pickup apparatuses.

NUMERICAL EXAMPLE 3

Figure 16:
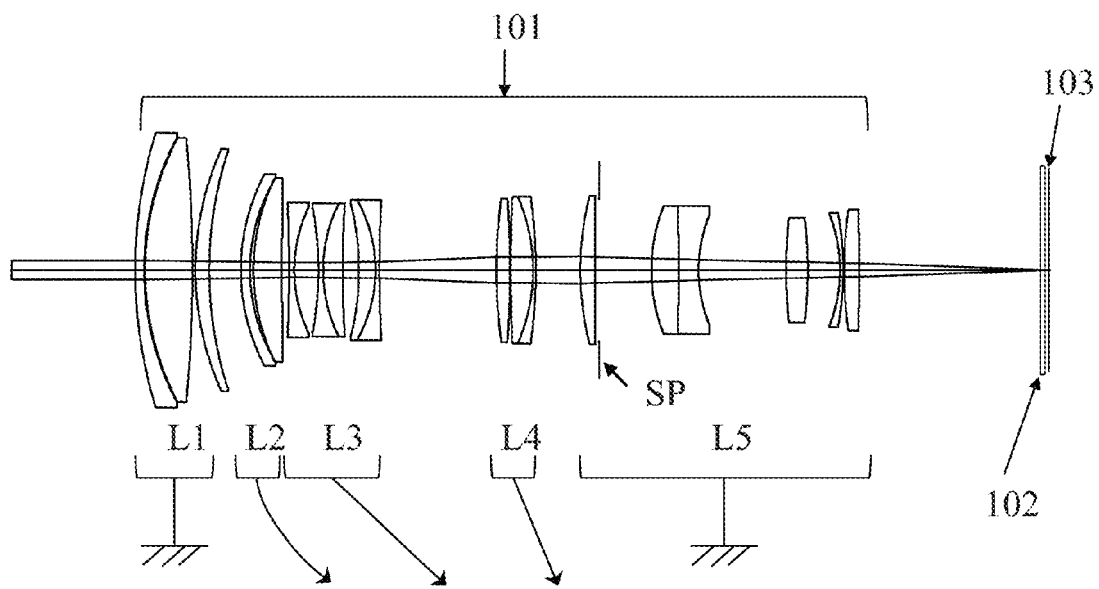
FIG. 16 is a sectional view of the image pickup optical system in Numerical Example 3.

FIG. 16 shows a configuration of an image pickup optical system that is Numerical Example 3 corresponding to Embodiment 1, which includes an imaging optical system 101, a lens array 102 and an image sensor 103. The imaging optical system 101 is a zoom lens capable of variation of magnification. Each of the lens cells constituting the lens array 102 has an object side planar surface and an image side convex surface. The lens array 102 views an optical image formed by the imaging optical system 101 as a virtual object and forms another optical image of the virtual object on the image sensor 103.

The imaging optical system 101 includes, in order from the object (object plane) side, a first lens group L1 having a positive refractive power, a second lens group L2 having a positive refractive power, a third lens group L3 having a negative refractive power, a fourth lens group L4 having a positive refractive power and a fifth lens group L5 having a positive refractive power. As shown below the respective lens groups L1 to L5 in FIG. 16, during variation of magnification from a wide-angle end to a telephoto end, the first and fifth lens groups L1 and L5 are unmoved, and the second, third and fourth lens groups L2 to L4 are moved along an optical axis as shown by arrows.

In this numerical example, the distance $P_{ex}$ from the exit pupil of the imaging optical system 101 to the image side conjugate plane 202 thereof is 129.8994 (mm), the lens cell pitch $\Delta_{LA}$ of the lens array 102 is 0.0256 (mm), and the pixel pitch $\Delta$ of the image sensor 103 is 0.0064 (mm). FIGS. 10, 12 and 13 respectively show the pixel shift ratio 6, the apparent maximum pixel size and the resolution including the pixel-shift super-resolution of this numerical example, which are calculated by using the above parameters, N=5, $l_r$=0.5 and $\epsilon=3\Delta$.

Moreover, the lens array 102 is disposed at a position where the distance $\sigma_1$ becomes 0.3712 (mm) and the distance $\sigma_2$ becomes 0.0740 (mm). Values of the conditional expressions (11) and (13) in this configuration are shown in Table 1.

In this numerical example, for example when $\epsilon=3\Delta$, the image side refocusing range is $\tau_{\pm}=\sigma_1\pm0.2784$ (mm).

As understood from FIG. 13, this numerical example can provide five high resolution focusing positions in the refocusing range. This numerical example can achieve, since the resolution of the refocused image increases near the distance $\tau_-$ as well as in Numerical Example 1, an image pickup apparatus capable of providing more number of the high resolution focusing positions as compared with conventional image pickup apparatuses.

NUMERICAL EXAMPLE 4

Figure 17:
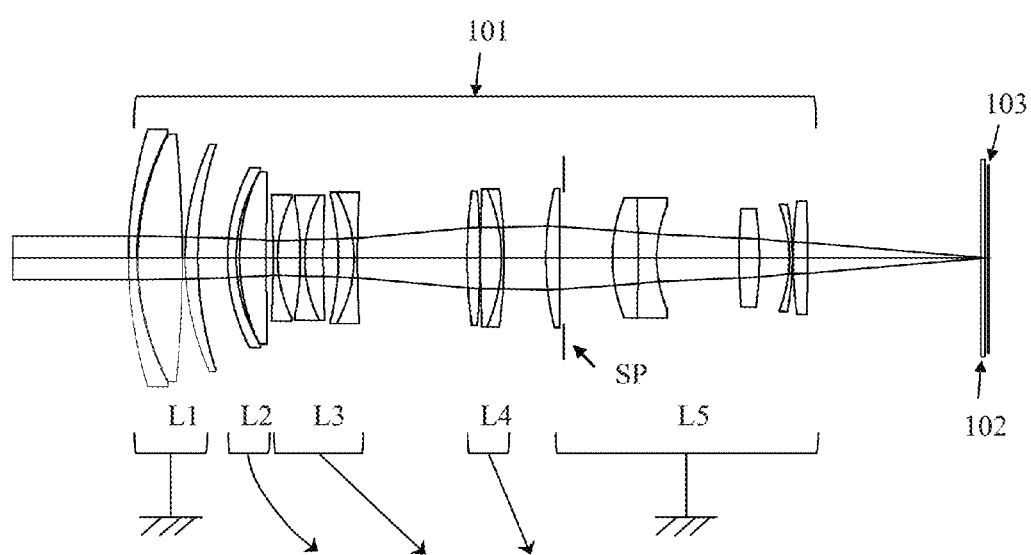
FIG. 17 is a sectional view of the image pickup optical system in Numerical Example 4.

FIG. 17 shows a configuration of an image pickup optical system that is Numerical Example 4 corresponding to Embodiment 2, which includes an imaging optical system 101, a lens array 102 and an image sensor 103. The imaging optical system 101 is a zoom lens capable of variation of magnification. Each of the lens cells constituting the lens array 102 has an object side planar surface and an image side convex surface. The lens array 102 views an optical image formed by the imaging optical system 101 as a real object and forms another optical image of the real object on the image sensor 103.

The imaging optical system 101 includes, in order from the object (object plane) side, a first lens group L1 having a positive refractive power, a second lens group L2 having a positive refractive power, a third lens group L3 having a negative refractive power, a fourth lens group L4 having a positive refractive power and a fifth lens group L5 having a positive refractive power. As shown below the respective lens groups L1 to L5 in FIG. 17, during variation of magnification from a wide-angle end to a telephoto end, the first and fifth lens groups L1 and L5 are unmoved, and the second, third and fourth lens groups L2 to L4 are moved on an optical axis as shown by arrows.

In this numerical example, the distance $P_{ex}$ from the exit pupil of the imaging optical system 101 to the image side conjugate plane 202 thereof is 129.8994 (mm), the lens cell pitch $\Delta_{LA}$ of the lens array 102 is 0.0192 (mm), and the pixel pitch $\Delta$ of the image sensor 103 is 0.0064 (mm). Moreover, the lens array 102 is disposed at a position where the distance $\sigma_1$ becomes −0.1114 (mm) and the distance $\sigma_2$ becomes 0.0556 (mm). Values of the conditional expressions (11) and (13) in this configuration are shown in Table 1.

In this numerical example, for example when $\epsilon=3.125\Delta$, the image side refocusing range is $\tau_{\pm}=\sigma_1 \pm 0.1160$ (mm).

This numerical example can provide three high resolution focusing positions in the refocusing range. This numerical example can achieve, since the resolution of the refocused image increases near the distance $\tau_-$ as well as in Numerical Example 1, an image pickup apparatus capable of providing more number of the high resolution focusing positions as compared with conventional image pickup apparatuses.

TABLE 1

|  | CONDITIONAL EXPRESSION (11) | CONDITIONAL EXPRESSION (13) |
| --- | --- | --- |
| NUMERICAL EXAMPLE 1 | 0.033 | 20.78 |
| NUMERICAL EXAMPLE 2 | 0.012 | 8.90 |
| NUMERICAL EXAMPLE 3 | 0.003 | 3.20 |
| NUMERICAL EXAMPLE 4 | 0.001 | 1.50 |

The present invention is not limited to these embodiments and various variations and modifications may be made without departing from the scope of the present invention.

This application claims the benefit of Japanese Patent Application No. 2012-115521, filed on May 21, 2012, which is hereby incorporated by reference herein in its entirety.

What is claimed is:

1. An image pickup apparatus comprising:
an imaging optical system to conjugate an object plane with an image side conjugate plane;
an image sensor including a plurality of pixels and to photoelectrically convert light rays from the imaging optical system; and
an optical element array including a plurality of optical element cells each of which conjugates the image side conjugate plane with the image sensor, mutually different ones of the optical element cells causing light rays from a same point on the object plane to enter mutually different pixels depending on positions on a pupil plane of the imaging optical system through which the light rays pass,
wherein:
an arrangement pitch of the optical element cells in the optical element array is 25 times or less of an arrangement pitch of the pixels in the image sensor; and
the following condition is satisfied:

$$1.0 \leq \frac{\Delta_{LA}}{\Delta}\left(1-\left|\frac{\sigma_2}{\sigma_1}\right|\right) \leq 30.0$$

where $\sigma_1$ represents a distance from an object side principal plane of the optical element array to the image side conjugate plane, $\sigma_2$ represents a distance from an image side principal plane of the optical element array to the image sensor, $\Delta$ represents the arrangement pitch of the pixels, and $\Delta_{LA}$ represents the arrangement pitch of the optical element cells.

2. An image pickup apparatus according to claim 1, wherein the following condition is satisfied:

$$0.0 < \left|\frac{\sigma_1}{P_{ex}}\right| < 0.1$$

where $P_{ex}$ represents a distance from an exit pupil of the imaging optical system to the image side conjugate plane.

3. An image pickup apparatus according to claim 1, wherein each of the optical element cells of the optical element array is a lens cell, and an image sensor side surface of the lens cell is a convex surface.

4. An image pickup apparatus according to claim 1, wherein each of the optical element cells of the optical element array is a lens cell, and an object plane side surface of the lens cell is a planar surface or a convex surface.

5. An image pickup apparatus according to claim 1, wherein the optical element array and the image sensor are disposed on an object plane side further than the image side conjugate plane.

6. An image pickup apparatus according to claim 1, wherein the optical element array and the image sensor are disposed on an opposite side to an object plane side with respect to the image side conjugate plane.

* * * * *